US 6,553,101 B1

(12) United States Patent
Kang

(10) Patent No.: US 6,553,101 B1
(45) Date of Patent: Apr. 22, 2003

(54) DOS-BASED CARD-TYPE VOICE MAIL SYSTEM

(75) Inventor: Byung-Dong Kang, Taegukwangyok-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/427,038

(22) Filed: Oct. 26, 1999

(30) Foreign Application Priority Data

Oct. 26, 1998 (KR) ............................................ 98-44857

(51) Int. Cl.[7] ................................................ H04M 1/64
(52) U.S. Cl. ..................... 379/67.1; 379/79; 379/88.25; 379/156
(58) Field of Search ........................ 379/67.1, 68, 75, 379/77, 84, 88.1, 88.22, 88.25, 156, 157, 166, 399.01, 399.02, 413.02, 88.27, 79, 93.05

(56) References Cited

U.S. PATENT DOCUMENTS

| 5,222,124 A | 6/1993 | Castaneda et al. ........ 379/88.22 |
| 5,291,479 A | * 3/1994 | Vaziri et al. ................. 370/525 |
| 5,452,341 A | 9/1995 | Sattar ....................... 379/88.27 |
| 5,528,670 A | 6/1996 | Elliot et al. ............... 379/88.25 |
| 5,583,920 A | 12/1996 | Wheeler, Jr. ............. 379/88.01 |
| 5,625,675 A | 4/1997 | Katsumaru et al. ...... 379/88.25 |
| 5,699,411 A | 12/1997 | Becker et al. ........... 379/88.22 |
| 5,844,968 A | 12/1998 | Choi ....................... 379/88.25 |

* cited by examiner

Primary Examiner—Fan Tsang
Assistant Examiner—Ovidio Escalante
(74) Attorney, Agent, or Firm—Robert E. Bushnell, Esq.

(57) ABSTRACT

A card-type voice mail system, connected to a key telephone system, includes: a key telephone system interface connected to a universal slot of the key telephone system for interfacing with the key telephone system; a codec for digitizing analog data received through the key telephone system interface from the key telephone system, and for converting the digitized data into analog data to supply the analog data to the key telephone system through the key telephone system interface; a voice mail card for compressing data digitized from the codec, and for restoring the compressed data to supply the restored data to the codec; a storage device for storing data compressed from the voice mail card, and for supplying the stored data to the voice mail card; a memory for loading a universal operating system; and a controller for controlling the overall operation of the card-type voice mail system according to the universal operating system.

22 Claims, 2 Drawing Sheets

DOS-BASED CARD-TYPE VOICE MAIL SYSTEM

CLAIM OF PRIORITY

This application makes reference to, incorporates the same herein, and claims all benefits accruing under 35 U.S.C. §119 from an application entitled DOS-BASED CARD-TYPE VOICE MAIL SYSTEM earlier filed in the Korean Industrial Property Office on Oct. 26, 1998, and there duly assigned Serial No. 98-44857.

BACKGROUND OF THE INVENTION

1. Field of the Invention

The present invention relates to a switching system, and more particularly, to a voice mail system connected to a switching system.

2. Description of the Related Art

Generally, a voice mail system is connected to a switching system as an independent device, which requires much space and is costly with respect to its maintenance. Further, because the voice mail system uses a dedicated operating system, it is difficult for a programmer to program its software without full knowledge of the operating system.

The patent to Becker et al., U.S. Pat. No. 5,699,411, entitled DOS COMPATIBLE DICTATION AND VOICE MAIL SYSTEM, discloses a DOS compatible voice mail system capable of being connected to a telephone system. However, the voice mail system must be connected to a host computer.

The patent to Choi, U.S. Pat. No. 5,844,968, entitled INTERFACING BETWEEN INDEPENDENT VOICE MAIL SYSTEM AND EXCHANGE, discloses an independent voice mail system connected to an electronic exchange.

The patents to Katsumaru et al. and Elliot et al., U.S. Pat. Nos. 5,625,675 and 5,528,670, respectively entitled VOICE MAIL COMMUNICATION SYSTEM, and VOICE MESSAGE-BASED ADMINISTRATION SYSTEM, respectively, each disclose voice mail systems connected to PBX switching systems.

The following three patents each discloses features in common with the present invention but are not as pertinent as the patents discussed above: U.S. Pat. No. 5,583,920 to Wheeler Jr., entitled INTELLIGENT PERIPHERAL IN VIDEO DIAL TONE NETWORK; U.S. Pat. No. 5,452,341 to Sattar, entitled INTEGRATED VOICE PROCESSING SYSTEM; and U.S. Pat. No. 5,222,124 to Castandeda et al., entitled PBX SYSTEM COMMUNICATIONS DEVICE.

SUMMARY OF THE INVENTION

It is, therefore, an object of the present invention to provide a DOS-based card-type voice mail system which is installed within a switching system, and which can easily have its software programmed.

To achieve the above and other objects of the present invention, there is provided a card-type voice mail system, comprising: a key telephone system interface connected to a universal slot of a key telephone system for interfacing with the key telephone system; a codec for digitizing analog data received through the key telephone system interface from the key telephone system, and for converting the digitized data into analog data to supply the analog data to the key telephone system through the key telephone system interface; a voice mail card for compressing data digitized from the codec, and for restoring the compressed data to supply the restored data to the codec; a storage device for storing data compressed by the voice mail card, and for supplying the stored data to the voice mail card; a memory for loading a universal operating system; and a controller for controlling the card-type voice mail system in accordance with the loaded universal operating system.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described hereinbelow with reference to the accompanying drawings. In the following description, numerous specific details are set forth to provide a more thorough understanding of the present invention. It will be apparent, however, to one skilled in the art that the present invention may be practiced without these specific details. In other instances, well known constructions or functions are not described in detail so as not to obscure the present invention.

Figure 1:
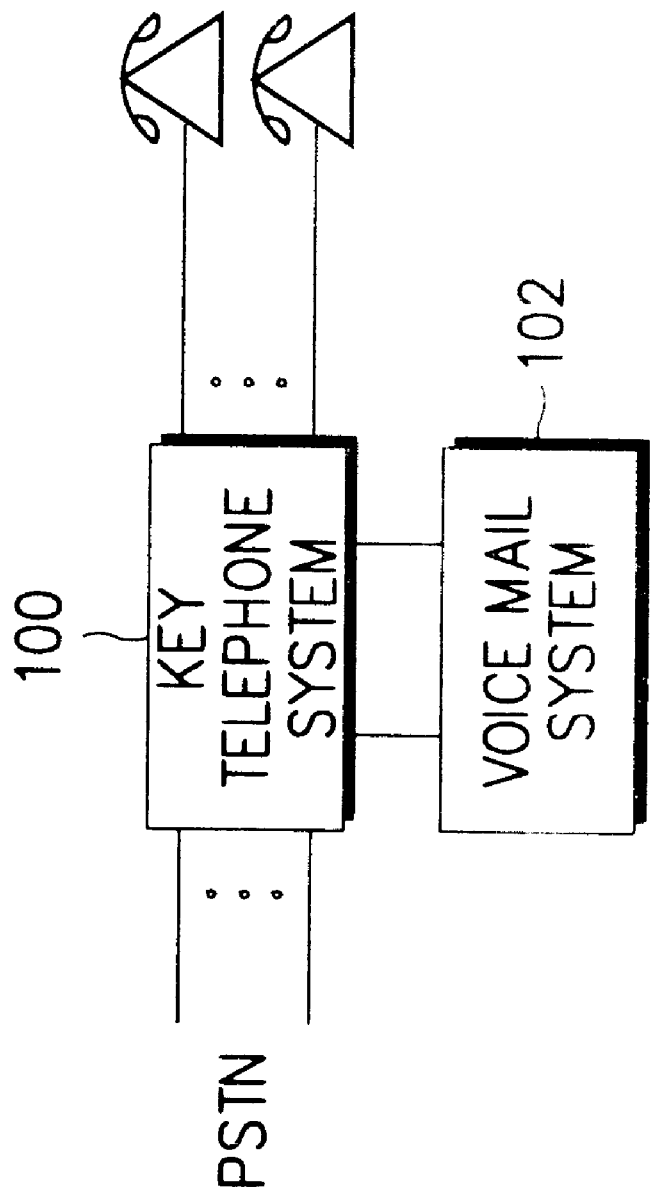
FIG. 1 is a diagram illustrating a voice mail system installed within a switching system according to the present invention.

Referring to FIG. 1, a card-type voice mail system 102 is installed in a universal slot within a key telephone system 100.

Figure 2:
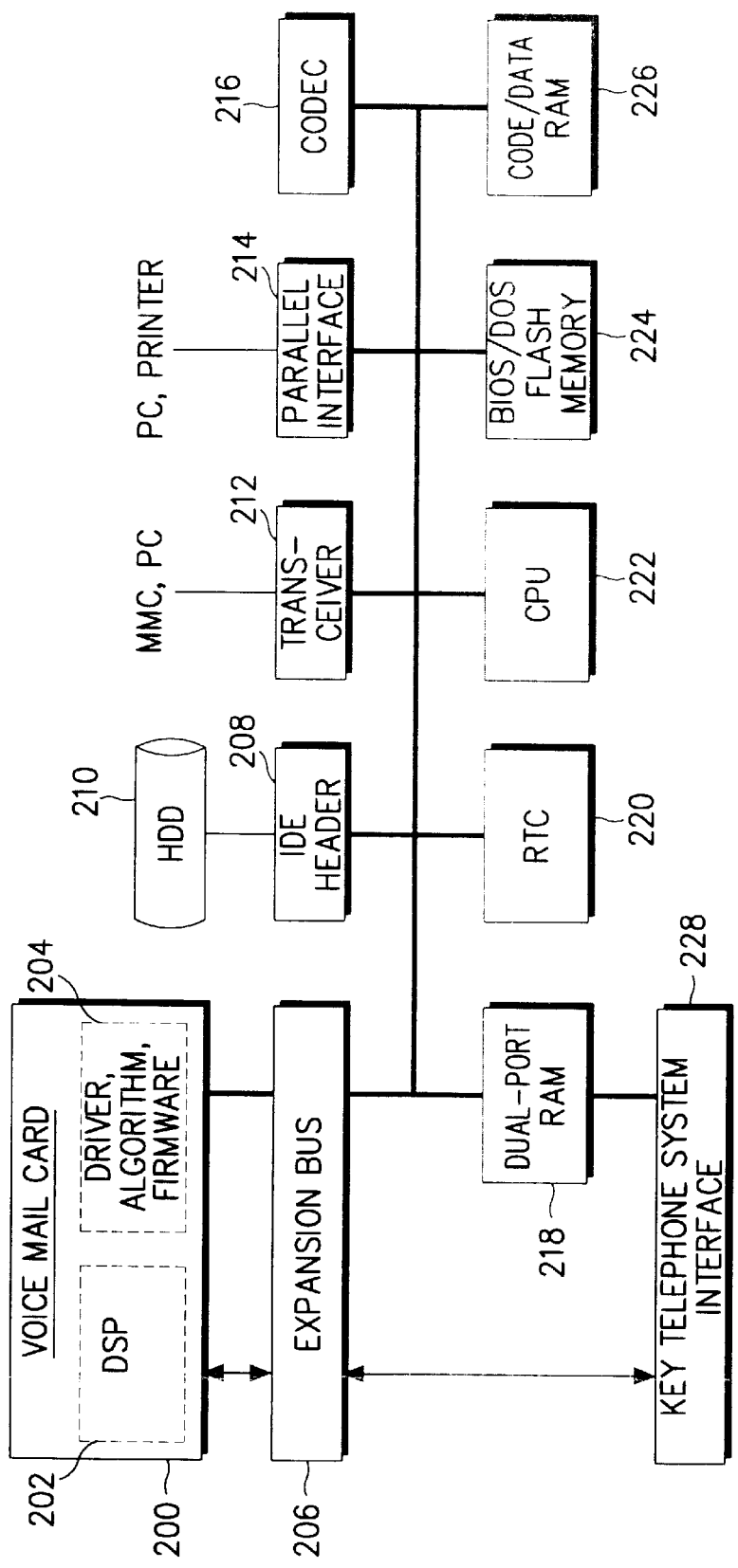
FIG. 2 is a block diagram of the voice mail system illustrated in FIG. 1 according to the present invention.

Referring to FIG. 2, the voice mail system 102 illustrated in FIG. 1 includes a central processing unit (CPU) 222 for performing BIOS/DOS (Basic Input Output System/Disk Operating System) by reading data from a flash memory 224. Therefore, the voice mall system 102 has a universal operating system BIOS/DOS. The CPU 222 controls the overall operation of the voice mail system 102 through a local bus of ISA (Industry Standard Architecture) and interprets commands from the key telephone system 100 or a voice mail card 200. The CPU 222 processes a real time event and manages a data flow in order to provide a faster system response time. A dual-port RAM (Random Access Memory) 218 is connected between the CPU 222 and a key telephone system interface 228, and between the voice mail card 200 and the key telephone system interface 228 via an expansion bus 206.

The key telephone system interface 228 provides a voice channel and an interprocess communication interface between the voice mail system 102 and the key telephone system 100 through the dual-port RAM 218. A real time clock (RTC) 220 supplies a clock to each part of the voice mail system 102. An integrated device electronics (IDE) header 208 stores voice data or facsimile data compressed from the voice mail card 200 in a hard disk drive (HDD) 210 or reads the compressed voice data or facsimile data from the HDD 210. A transceiver 212 performs man-machine communication (MMC) or transmits data to a personal computer (PC). A parallel interface 214 optionally interfaces with an external device, for example, a PC or a printer. A codec 216 implements filtering, sampling and digitizing for voice data or facsimile data supplied to the voice mail system 102 to supply the digitized data to the voice mail card 200 through the expansion bus 206. The codec 216 also converts the voice data or facsimile data received from the voice mail card 200 into analog data to supply the analog data to the key telephone system 100. The digitizing rate of the codec 216 is selected on a channel basis and may vary whenever voice messages are recorded.

The voice mail card 200 includes a digital signal processor (DSP) 202 and a software part 204 consisting of a driver, algorithm and firmware. The software of the voice mail card 200 is stored in a RAM (not shown) within the voice mail card 200. This RAM loads the software from a code/data RAM 226 during initialization. The DSP 202 implements various voice mail functions by means of the software. The DSP 202 automatic-gain-controls input data to compensate for the variation of its level, compresses the data, and supplies the compressed data to the IDE header 208 so as to be stored in the HDD 210. The DSP 202 may use an ADPCM (Adaptive Differential Pulse Code Modulation) or PCM (Pulse Code Modulation) algorithm in order to compress data. Upon receiving compressed data through the IDE header 208, the DSP 202 restores it and supplies the restored data to the codec 216. The DSP 202 controls a volume and playback speed in response to a demand from a user and generates a tone signal. The code/data RAM 226, which is a main memory, stores data generated in the process of executing a program by means of the CPU 222.

As described above, the voice mail system can be installed in a universal slot within the key telephone system in the form of a card. Therefore, cost and space can be saved. Moreover, since the voice mail system uses a universal operating system, it is easy to program its software.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A card-type voice mail system connected to a key telephone system, said voice mail system comprising:
   a key telephone system interface connected to a universal slot of the key telephone system for interfacing with said key telephone system;
   a codec connected to said key telephone system interface for digitizing analog data received through said key telephone system interface from said key telephone system, and for converting the digitized data into analog data to supply said analog data to said key telephone system through said key telephone system interface;
   a voice mail card connected to said codec and to said key telephone system interface for compressing data digitized from said codec, and for restoring the compressed data to supply the restored data to said codec;
   a storage device connected to said voice mail card, to said codec, and to said key telephone system interface for storing data compressed by said voice mail card, and for supplying the stored data to said voice mail card;
   a memory for loading a universal operating system; and
   a controller connected to said memory, to said voice mail card, to said codec, and to said key telephone system interface for controlling said card-type voice mail system in accordance with said loaded universal operating system.

2. The system of claim 1, further comprising a real time clock for supplying a clock to the voice mail system.

3. The system of claim 2, wherein said controller performs the loaded universal operating system by reading data from the memory, said memory comprising a flash memory.

4. The system of claim 1, further comprising an integrated device electronics header for interfacing the voice mail card with the storage device.

5. The system of claim 1, wherein said integrated device electronics header stores at least one of voice data and facsimile data compressed from the voice mail card.

6. The system of claim 1, wherein said integrated device electronics header reads at least one of voice data and facsimile data from the storage device.

7. The system of claim 1, further comprising a transceiver for performing man-to-machine communication and for transmitting data to a personal computer.

8. The system of claim 1, further comprising a parallel interface for interfacing the voice mail system with an external device.

9. The system of claim 1, further comprising a code/data random access memory for storing data generated during execution of a program by the controller.

10. The system of claim 1, further comprising a dual-port random access memory for interfacing the key telephone system interface with other elements of the voice mail system.

11. The system of claim 1, wherein said dual-port random access memory is connected between the controller and the key telephone system interface, and between said voice mail card and the key telephone system interface.

12. The system of claim 1, further comprising an expansion bus for interfacing the voice mail card with other elements of the voice mail system.

13. The system of claim 7, said voice mail card comprising a digital signal processor and software including a driver, an algorithm, and firmware.

14. The system of claim 13, further comprising an integrated device electronics header connected between said digital signal processor and said storage device, and wherein said digital signal processor automatic-gain controls input data to compensate for variation of level, compresses the input data and supplies the compressed data to the integrated devices electronics header for storage in the storage device.

15. The system of claim 14, wherein said digital signal processor uses one of adaptive differential pulse code modulation and pulse code modulation to compress the input data.

16. The system of claim 13, wherein the digital signal processor controls a volume and a playback speed in response to a demand from a user, and generates a tone signal.

17. The system of claim 1, wherein said controller controls operation of the card-type voice mail system through a local bus, and interprets commands from at least one of the key telephone system and the card-type voice mail card system.

18. The system of claim 1, wherein said controller processes a real time event and manages data flow to provide faster system response time.

19. The system of claim 1, wherein said key telephone system interface provides at least one of a voice channel and an interprocess communications interface between the card-type voice mail system and the key telephone system.

20. The system of claim 1, wherein said codec performs at least one of filtering, sampling and digitizing of at least one of voice data and facsimile data to supply output data to the voice mail card.

21. The system of claim 20, further comprising an expansion bus between said codec and said voice mail card for conveying the output data from the codec to the voice mail card.

22. The system of claim 1, wherein a digitizing rate of said codec is selected on a channel basis.

* * * * *